(No Model.)
J. THOMSON.
POINTER AND DIAL FOR COUNTING REGISTERS.
No. 476,105.   Patented May 31, 1892.
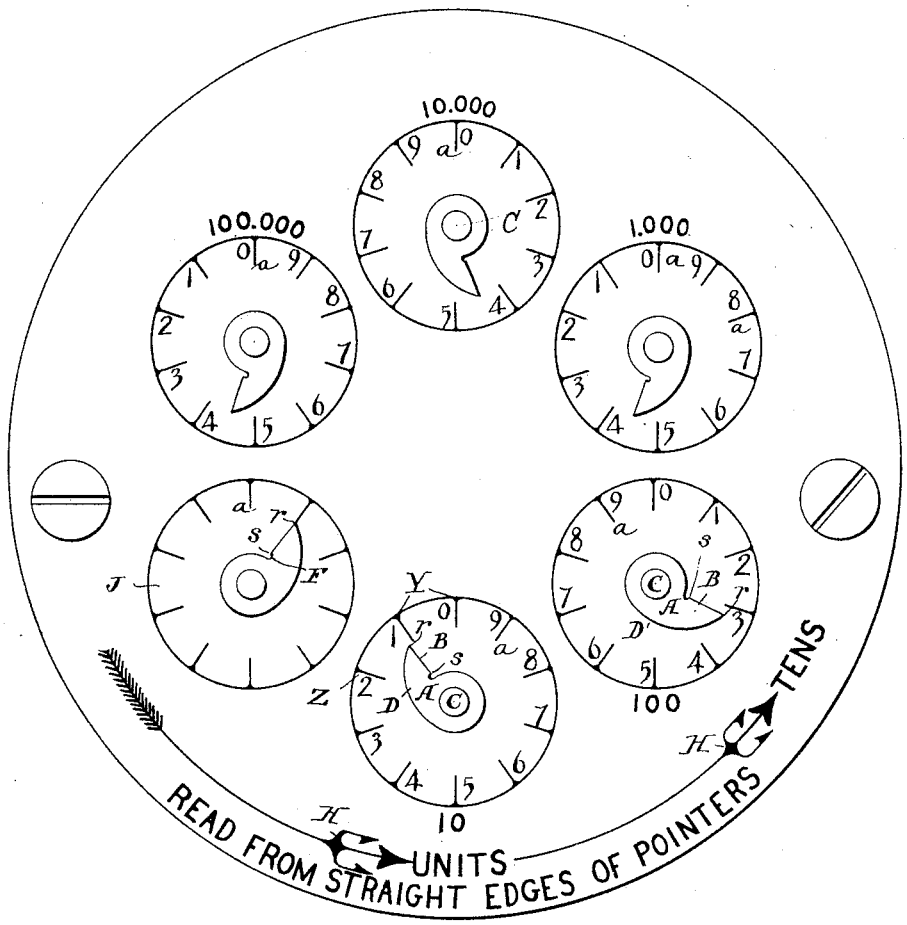

UNITED STATES PATENT OFFICE.

JOHN THOMSON, OF BROOKLYN, NEW YORK.

POINTER AND DIAL FOR COUNTING-REGISTERS.

SPECIFICATION forming part of Letters Patent No. 476,105, dated May 31, 1892.

Application filed March 14, 1892. Serial No. 424,895. (No model.)

*To all whom it may concern:*

Be it known that I, JOHN THOMSON, a citizen of the United States, residing in Brooklyn, in the county of Kings and State of New York, have invented certain new and useful Improvements in Pointers and Dials for Counting-Registers, of which the following is a specification.

My invention relates to counting-registers, and more particularly to the construction and arrangement of the dials and pointers used in connection therewith; and it has for its object to provide a simple, cheap, and effective construction which shall lessen the liability of erroneously reading the figures or indices of the register; and to these ends my invention consists in the various features of construction, arrangement, and operation, substantially as hereinafter more particularly pointed out in the claims.

In the drawing I have shown a general plan or face view of a counting-register embodying my invention. The register is shown as having a circular face, upon which are arranged a number of dials, and connected to be used with each dial is a pointer A, and this pointer is so constructed and arranged that it does not in any way cover any of the numerals or indices upon the face of the dial, the pointer not reaching out to the numerals, but revolving within a circle bounded by the numerals and indices. Thus as the pointer rotates all of the numerals or indices will be exposed to view.

In order that the dial can be accurately read, I construct the pointer with one of its edges, as B, straight and radiating from the center of its pivot C toward the numerals, while the other edge D of the pointer is curved, being shown as curving from its outer extremity to the hub. The intersection of the straight edge or radial projection with the hub is sharply nicked, as at F, to more clearly define the straight edge. By this construction it will be seen that, while the figures or other indices on the dial are at all times fully exposed to view, the pointers being of less radius than the indices and not reaching out to them, the sharply-defined corners or points r s, which bound or define the straight edge, furnish a guide to the eye for accurately reading the numerals, as the exact coincidence of the pointer with any particular graduation on the dial may be much more certainly defined than by the ordinary form heretofore generally used. It will be seen that in reading the dial three points are practically brought into alignment, two of which are moving at unequal velocities, and through this arrangement the graduations can be most accurately read.

In order to further aid in accurately reading the dials, I arrange the graduating lines *a* so that they will project inwardly from the periphery or outer circle of the dial to a considerable extent toward the center of the dial, and thus form on the face of the dial a series of recesses apparently having an open inner side toward the pointer, while the other sides are composed of a segment of the circumference of the dial and two inwardly-projecting graduations. I arrange in these recesses the numerals or other indices which correspond to the value of each space on the dial which should be given to the pointer during its travel through any given recess or from one graduation to the other.

In order that there shall be no error in reading the dial, I mark each space so as to indicate not the exact amount registered, but the integral amount to be given or read for each hand. The advantages of this will be seen from the drawing, wherein the dial J is supposed to be a decimal-dial, and the recesses may or may not be numbered, while the numerals on the adjacent dial are supposed to represent the integrals of the decimal-dial. It will be seen that the space Y is marked "0," and it will be understood that the pointer A of this dial is to be read "0" as long as the straight edge B is in line with this space, and not until it reaches the divisional line between the space "0" and "1" is it to be given the value of one. It will further be seen that the next space is marked "1," and it will be understood that the pointer A of this dial is to be given the value of one until its straight edge B corresponds to the second graduation Z, when of course it is to be given the value of two, and so on throughout the reading of the entire register. It will thus be seen that the inspector will be less liable to error, as he will always give the pointer the value indicated by the straight edge, and this will be the correct reading of the register.

What I claim is—

1. In a counting-register having a series of indices around its periphery, a pointer having one straight edge and the other curved, the said pointer not reaching out to the indices, substantially as described.

2. In a counting-register having a series of indices around its periphery, the pointer having one straight edge terminating at the points *r s* and the other edge curved, the extremity *r* of the straight edge not reaching out to the indices, substantially as described.

In testimony whereof I have signed my name to this specification in the presence of two subscribing witnesses.

JOHN THOMSON.

Witnesses:
 ROBERT S. CHAPPELL,
 G. P. KRAMER.